(12) United States Patent
Hirose

(10) Patent No.: US 7,751,128 B2
(45) Date of Patent: Jul. 6, 2010

(54) WIDE-ANGLE LENS

(75) Inventor: Masatoshi Hirose, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 50 days.

(21) Appl. No.: 12/209,026

(22) Filed: Sep. 11, 2008

(65) Prior Publication Data

US 2009/0080089 A1 Mar. 26, 2009

(30) Foreign Application Priority Data

Sep. 20, 2007 (JP) .............................. 2007-243549

(51) Int. Cl.
*G02B 13/04* (2006.01)
*G02B 3/02* (2006.01)
(52) U.S. Cl. .................. 359/753; 359/749; 359/716
(58) Field of Classification Search ................ 359/716, 359/717, 749, 753, 784
See application file for complete search history.

(56) References Cited

U.S. PATENT DOCUMENTS 7,304,808 B2 * 12/2007 Hirose et al. ................. 359/784
7,495,845 B2 *  2/2009 Asami ......................... 359/753

FOREIGN PATENT DOCUMENTS

JP  2005-321742  11/2005

* cited by examiner

*Primary Examiner*—David N Spector
(74) *Attorney, Agent, or Firm*—Cohen Pontani Lieberman & Pavane LLP

(57) ABSTRACT

A wide-angle lens whose angle of view is more than 90 degrees and less than 120 degrees includes, in order from an object side thereof: a first lens having a negative power and including a spherical glass body; a second lens having a positive power and including an aspheric surface; and a third lens having a positive power and including an aspheric surface.

5 Claims, 4 Drawing Sheets

WIDE-ANGLE LENS

This application is based on Japanese Patent Application No. 2007-243549 filed on Sep. 20, 2007, in Japanese Patent Office, the entire content of which is hereby incorporated by reference.

TECHNICAL FIELD

The present invention relates to a wide-angle lens that is excellent in optical performance, low in cost, and compact in size, and in particular, to a wide-angle lens that is suitable to a digital input equipment (represented by a digital still camera and a digital video camera) such as a monitoring camera and a vehicle-mounted camera each having a solid-state imaging device.

BACKGROUND

There have been suggested many wide-angle lenses used in a monitoring camera and a vehicle-mounted camera each having a solid-state imaging device.

In the vehicle-mounted camera, a wide-angle lens is used mainly as a rear view monitor (back monitor) in many cases, and many of them have an angle of view of about 150-170° (for example, see Unexamined Japanese Patent Application Publication No. 2005-321742).

SUMMARY

In recent years, there have also been emerged vehicle-mounted cameras applied for a front-view monitor used in an intersection and for a side-view monitor used for prevention of losing wheels, in addition to the vehicle-mounted camera applied for a conventional rear-view monitor (back monitor).

The front-view monitor is used for watching vehicles and others coming from the left side and the right side in the intersection, and an angle of view in the horizontal direction of the wide-angle lens needs to exceed 180°. Further, the side-view monitor is used to prevent losing wheels, and its angle of view does not always need to exceed 150°, and it is sometimes enough to be about 110°.

An object of the present invention is to propose a wide-angle lens which has angle of view exceeding 90° and less than 120° and which is compact in size and excellent in optical performance.

The preferred embodiment of the invention is a wide-angle lens that has an angle of view more than 90 degrees and less than 120 degrees. The wide-angle lens comprises in order from an object side thereof: a first lens having a negative power and comprising a glass body including a spherical surface; a second lens having a positive power comprising an aspheric surface; and a third lens having a positive power comprising an aspheric surface.

By making the angle of view to be more than 90° and to be less than 120°, the design conditions for the wide-angle lens are more eased, compared with a conventional wide-angle lens. Accordingly, it is possible to provide a low cost and compact wide-angle lens having excellent optical performances while having a wide angle of view, when compared with a conventional wide-angle lens.

In the above embodiment, the wide-angle lens may satisfy following expressions.

$$-3.3 < f1/f < -1.8 \quad (1)$$

$$1.4 < f3/f < 2.2 \quad (2)$$

In these expressions, f is a focal length of the wide-angle lens, f1 is a focal length of the first lens, and f3 is a focal length of the third lens.

In the above embodiment, the wide-angle lens may satisfy following expressions.

$$vd2 < 50 \quad (3)$$

$$vd3 > 50 \quad (4)$$

In these expressions, vd2 is an Abbe number of the second lens, and vd3 is an Abbe number of the third lens.

In the above embodiment, the wide-angle lens may further comprise a diaphragm arranged between the second lens and the third lens.

In the above embodiment, each of the second lens and the third lens may be a plastic lens.

In the embodiment stated above, it is possible to provide a low-cost and compact wide-angle lens having an excellent optical performance and a wide angle of view as a three-lens-structured image-pickup lens for a solid-state imaging device.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
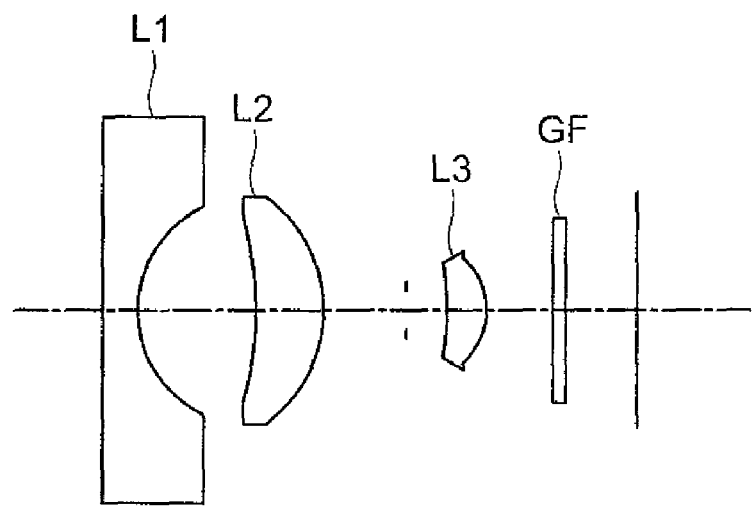
FIG. 1 is a schematic diagram of a wide-angle lens in Example 1.

A wide-angle lens representing a preferred embodiment of the invention will be explained as follow, referring to the drawings.

"Power" mentioned in the present specification indicates an amount defined by a reciprocal of a focal length.

FIGS. 1, 3, 5 and 7 are cross sections indicating lens arrangements in Example 1-Example 4, respectively.

In each of FIGS. 1, 3, 5 and 7, the wide-angle lens is composed of the first lens L1 having negative power, the second lens L2 having positive power, an aperture stop (diaphragm), the third lens L3 having positive power and glass filter GF, in this order from an object side of the wide-angle lens.

In detailed explanation, the first lens L1 is made of a glass body including at least one spherical surface, in other words, the first lens L1 is a spherical lens having a glass lens body. Each of the second lens L2 and the third lens L3 has at least one aspheric surface thereon.

By constituting in this way, it is possible to obtain an excellent optical performance.

Further, when the first lens L1 is formed as a glass lens, it is not necessary to provide a protective cover in particular, when using in a vehicle-mounted camera, for example.

In more detailed explanation, the body of the first lens L1 can be formed by a flat surface and a spherical surface, but is preferably formed by opposing spherical surfaces.

The second lens L2 and the third lens L3 can be formed with general optical materials such as glass materials and resins. However, when the second lens L2 and the third lens L3 are formed to be plastic lenses as in the present embodiment, weight reduction and cost reduction of a wide-angle lens can be expected, which is preferable.

Further, when each of the second lens L2 and the third lens L3 is made to be a plastic lens having an at least one aspheric surface thereon, the number of lenses can be reduced, resulting in cost reduction and downsizing, compared with an occasion where each of the second lens L2 and the third lens L3 is formed with spherical surfaces.

Next, the aforesaid conditional expression will be explained. Meanwhile, in each example, it is not necessary to satisfy all of the conditional expressions simultaneously, and sufficient effects can be exhibited by satisfying each conditional expression independently. From viewpoints of optical performances, downsizing or assembly efficiency, it is naturally preferable that all of the respective conditional expressions are satisfied.

With respect to a value of conditional expression (1) of f1/f, when the value exceeds the lower limit of conditional expression (1), a sufficient back focal distance can be secured, while, when the value is lower than the upper limit of conditional expression (1), distortion can be controlled, which is preferable.

With respect to a value of conditional expression (2) of f3/f, when the value exceeds the lower limit of conditional expression (2), field curvature aberration can be controlled, while, when the value is lower than the upper limit of conditional expression (1), distortion can be controlled, which is preferable.

Each of conditional expression (3) of vd2 and conditional expression (4) of vd3 is a conditional expression concerning chromatic aberration. It is known that Abbe's number of general optical materials such as glass materials and resins takes values from 10 to 95, and both of vd2 and vd3 can take any number within this range. However, it is preferable, from the following reasons, that vd2 satisfies conditional expression (3) and vd3 satisfies conditional expression (4). If a value of conditional expression (3) is smaller than the upper limit thereof, magnification chromatic aberration turns out to be smaller and deterioration of optical performance can be controlled. Further, if a value of conditional expression (4) is greater than the lower limit thereof, longitudinal chromatic aberration and magnification chromatic aberration turn out to be smaller and deterioration of optical performance can be controlled.

EXAMPLES

Lens data of wide-angle lenses in Example 1-Example 4 are shown below.

Symbols used in each Example are as follows.
f: Focal length of overall system
F: F number
ω: Half angle of field
R: Radius of curvature
d: Lens interval
nd: Refractive index for d line
vd: Abbe's number In each Example, a surface number followed by "*" represents a surface in an aspheric shape. A shape of the aspheric surface is expressed by the following expression under the assumption that an apex of the surface is an origin, an X-axis extends in the optical axis direction and h represents a height in the direction perpendicular to the optical axis.

$$X(H) = C \cdot H^2 / \{1 + (1 - \epsilon \cdot C^2 \cdot H^2)^{1/2}\} + \Sigma Ai \cdot Hi$$

In the expression, H represents a height in the direction perpendicular to an optical axis, X(H) represents an amount of displacement in the optical axis direction at a position whose height is H, C represents a paraxial curvature, $\epsilon$ represents a quadratic curve parameter, Ai represents $i^{th}$ aspheric surface coefficient, and Hi represents a symbol indicating $i^{th}$ power of H.

Example 1

Table 1 shows the lens data of Example 1.

Figure 2:
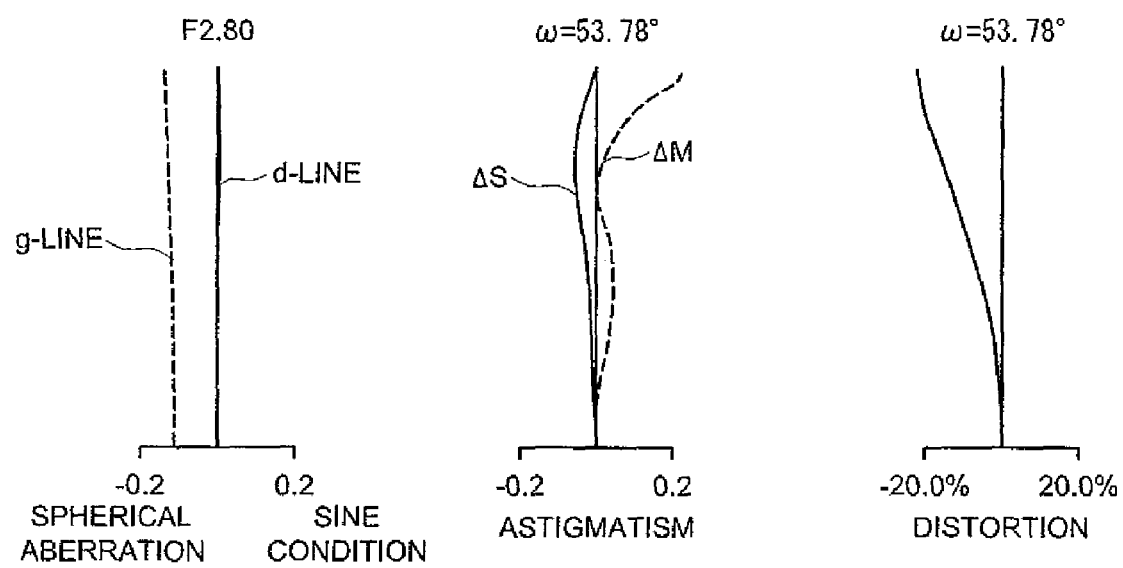
FIG. 2 is an aberration diagram of a wide-angle lens in Example 1.
Figure 3:
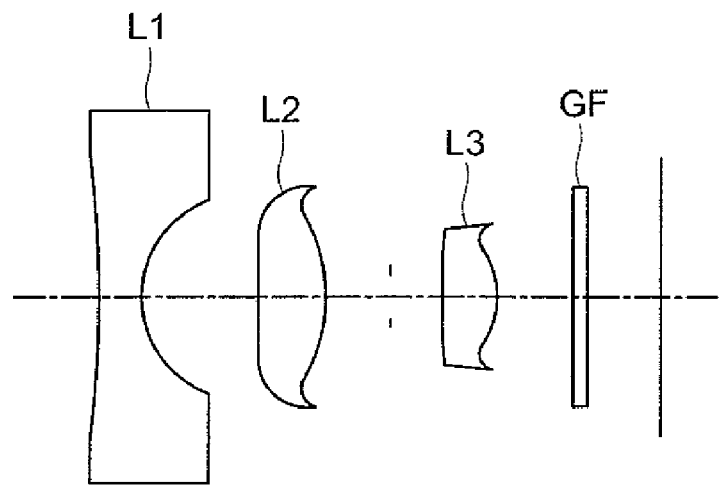
FIG. 3 is a schematic diagram of a wide-angle lens in Example 2.

FIG. 2 shows an aberration diagram including spherical aberration, astigmatism and distortion in Example 1.

TABLE 1

| Surface No. | R (mm) | d (mm) | nd | vd |
|---|---|---|---|---|
| 1 | ∞ | 0.90 | 1.56384 | 60.31 |
| 2 | 3.192 | 2.71 | | |
| 3* | −7.817 | 1.54 | 1.58340 | 30.23 |
| 4* | −2.949 | 1.89 | | |
| 5 (diaphragm) | ∞ | 0.93 | | |
| 6* | −23.935 | 0.97 | 1.53048 | 55.72 |
| 7* | −1.831 | 1.50 | | |
| 8 | ∞ | 0.30 | 1.51680 | 64.17 |
| 9 | ∞ | 1.57 | | |
| Image surface | ∞ | | | |

| Aspheric surface coefficient |
|---|

$3^{rd}$ surface k = 0
A4 = 0.000198540076574
A6 = 0.00144481356719
A8 = −0.000312928549056
A10 = 1.35849895974E−05

$4^{th}$ surface k = 0
A4 = 0.0130506601646
A6 = 2.82341204926E−05
A8 = −0.000206267315661
A10 = 2.54075103773E−05

$6^{th}$ surface k = 0
A4 = 0.0130506601646
A6 = 2.82341204926E−05
A8 = −0.000206267315661
A10 = 2.54075103773E−05

$7^{th}$ surface k = 0
A4 = 0.00845532563026
A6 = 0.000939105053217
A8 = −0.00687017460548
A10 = 0.0053260174989

| Focal length | 2.08 |
|---|---|
| F number | 2.8 |

TABLE 1-continued

| | |
|---|---|
| Angle of view | 107.56 |
| Image height | 2.25 |
| Total lens length | 12.21 |
| Back focal distance | 3.27 |

Example 2

Table 2 shows the lens data of Example 2.

Figure 4:
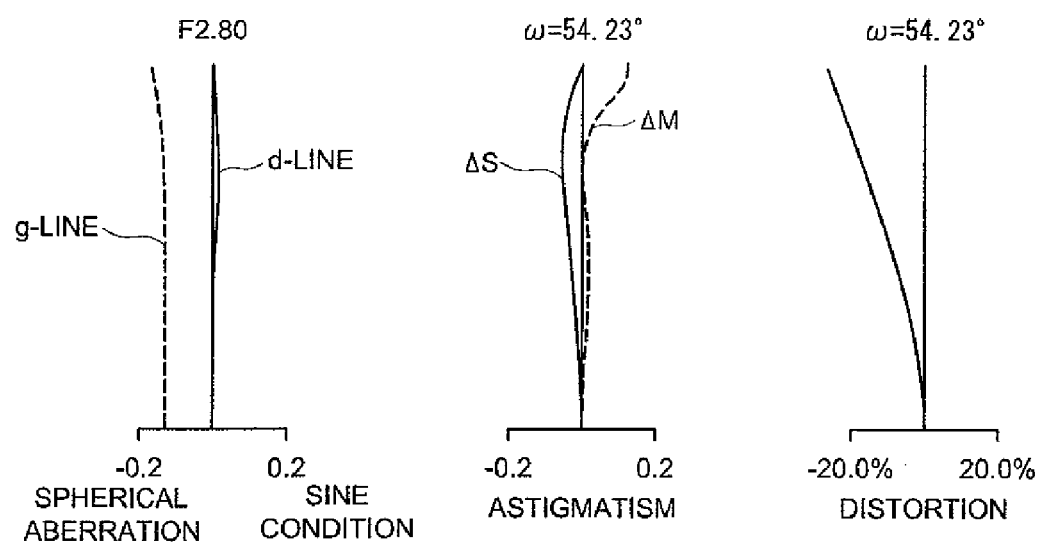
FIG. 4 is an aberration diagram of a wide-angle lens in Example 2.
Figure 5:
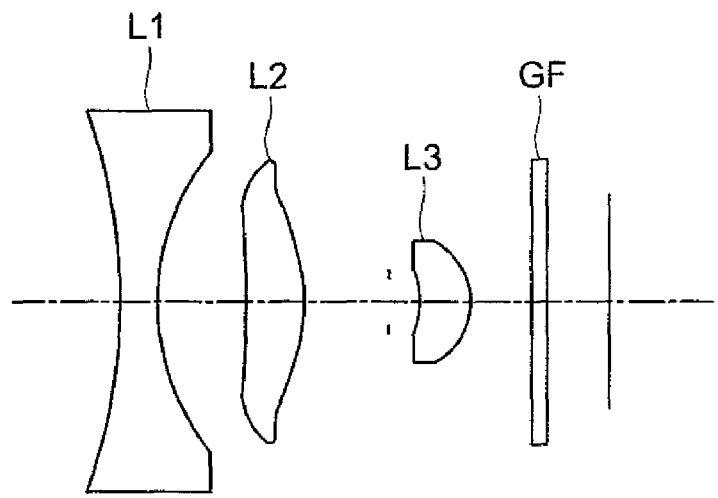
FIG. 5 is a schematic diagram of a wide-angle lens in Example 3.

FIG. 4 shows an aberration diagram including spherical aberration, astigmatism and distortion in Example 2.

TABLE 2

| Surface No. | R (mm) | d (mm) | nd | vd |
|---|---|---|---|---|
| 1 | −57.234 | 0.90 | 1.56384 | 60.31 |
| 2 | 2.306 | 2.30 | | |
| 3* | 1694.562 | 1.30 | 1.58340 | 30.23 |
| 4* | −3.000 | 1.32 | | |
| 5 (diaphragm) | ∞ | 1.06 | | |
| 6* | −24.877 | 1.07 | 1.53048 | 55.72 |
| 7* | −1.924 | 1.50 | | |
| 8 | ∞ | 0.30 | 1.51680 | 64.17 |
| 9 | ∞ | 1.47 | | |
| Image surface | ∞ | | | |

Aspheric surface coefficient $3^{rd}$ surface k = 0
A4 = 0.00817911479
A6 = 0.0024608103235
A8 = −0.000969586913443
A10 = 0.000187578094609

$4^{th}$ surface k = 0
A4 = 0.0224820452568
A6 = −0.00267950619
A8 = 7.66535990629E−05
A10 = 0.000114811227355

$6^{th}$ surface k = 0
A4 = −0.00349790657
A6 = −0.0119380849927
A8 = 0.0331416138898
A10 = −0.00863721527112

$7^{th}$ surface k = 0
A4 = 0.0161037276
A6 = 0.0117865095923
A8 = −0.0073996909961
A10 = 0.00641080451032

| | |
|---|---|
| Focal length | 2.06 |
| F number | 2.8 |
| Angle of view | 108.46 |
| Image height | 2.25 |
| Total lens length | 11.11 |
| Back focal distance | 3.16 |

Example 3

Table 3 shows the lens data of Example 3.

Figure 6:
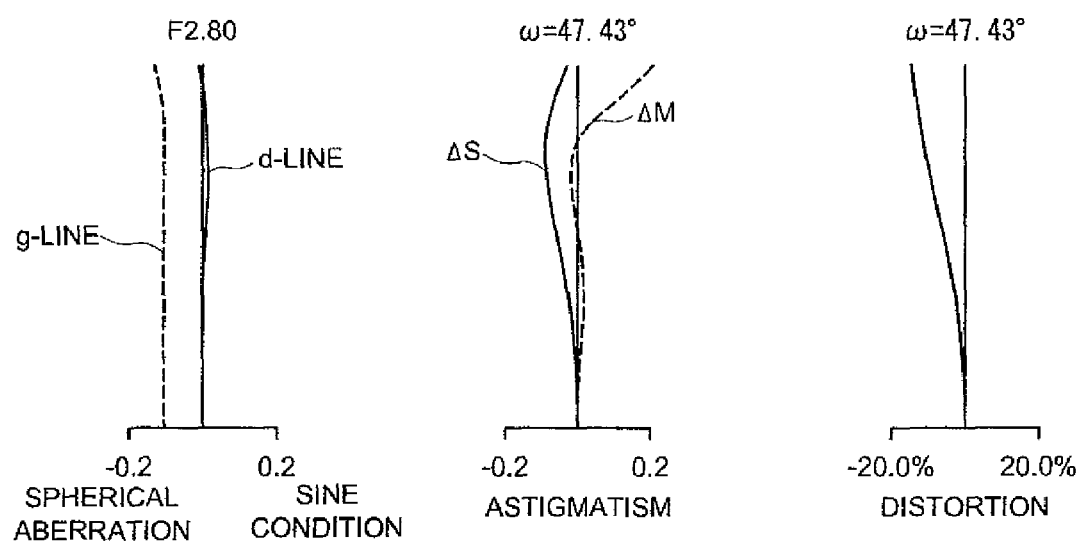
FIG. 6 is an aberration diagram of a wide-angle lens in Example 3.
Figure 7:
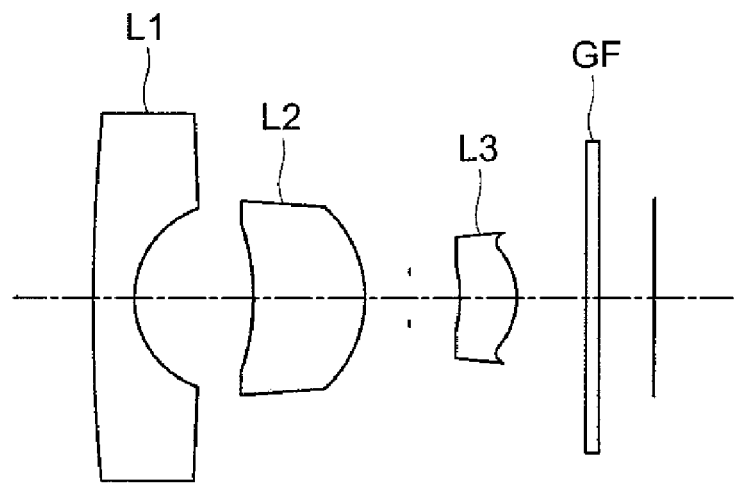
FIG. 7 is a schematic diagram of a wide-angle lens in Example 4.

Meanwhile, FIG. 6 shows an aberration diagrams including spherical aberration, astigmatism and distortion in Example 3.

TABLE 3

| Surface No. | R (mm) | d (mm) | nd | vd |
|---|---|---|---|---|
| 1 | −15.444 | 0.90 | 1.56384 | 60.31 |
| 2 | 6.251 | 2.09 | | |
| 3* | −13.300 | 1.40 | 1.58340 | 30.23 |
| 4* | −3.534 | 2.06 | | |
| 5 (diaphragm) | ∞ | 0.68 | | |
| 6* | −6.766 | 1.25 | 1.53048 | 55.72 |
| 7* | −1.553 | 1.50 | | |
| 8 | ∞ | 0.30 | 1.51680 | 64.17 |
| 9 | ∞ | 1.57 | | |
| Image surface | ∞ | | | |

Aspheric surface coefficient $3^{rd}$ surface k = 0
A4 = 0.00157268613424
A6 = 0.000891094241168
A8 = −7.22002307298E−05
A10 = 3.05229156678E−06

$4^{th}$ surface k = 0
A4 = 0.00925630859075
A6 = 0.000646259022957
A8 = −9.72484623323E−05
A10 = 6.69418858731E−06

$6^{th}$ surface k = 0
A4 = −0.0542254845905
A6 = −0.0240496924714
A8 = 0.0308012988227
A10 = −0.0155448648985

$7^{th}$ surface k = 0
A4 = 0.0113237005971
A6 = 0.000654263204829
A8 = −0.00305257360566
A10 = 0.00317108372734

| | |
|---|---|
| Focal length | 2.43 |
| F number | 2.8 |
| Angle of view | 94.86 |
| Image height | 2.25 |
| Total lens length | 11.64 |
| Back focal distance | 3.27 |

Example 4

Table 4 shows the lens data of Example 4.

Figure 8:
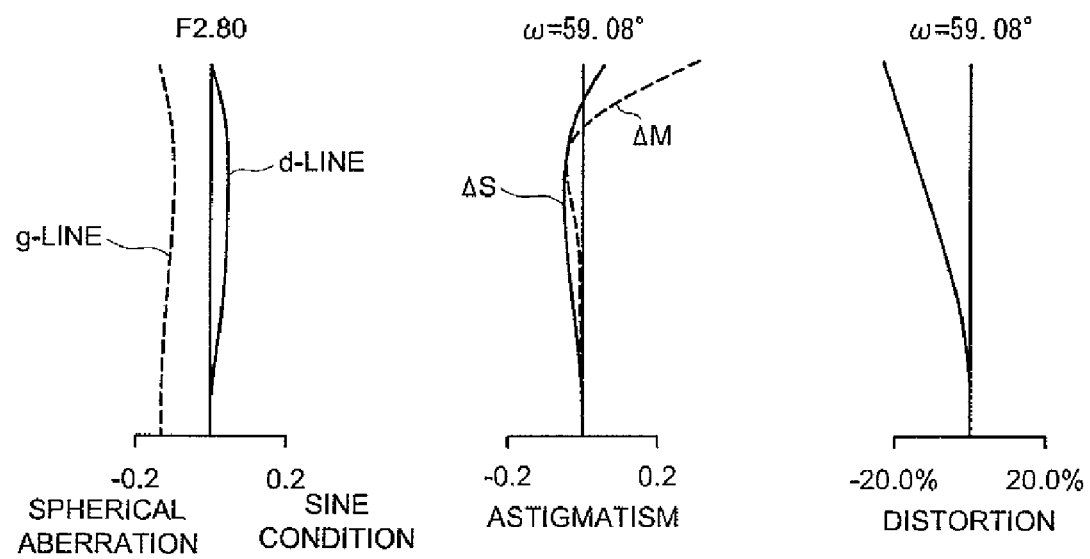
FIG. 8 is an aberration diagram of a wide-angle lens in Example 4.

Incidentally, FIG. 8 shows an aberration diagrams including spherical aberration, astigmatism and distortion in Example 4.

TABLE 4

| Surface No. | R (mm) | d (mm) | nd | vd |
|---|---|---|---|---|
| 1 | 39.022 | 0.90 | 1.56384 | 60.31 |
| 2 | 2.430 | 2.57 | | |
| 3* | −7.891 | 2.49 | 1.58340 | 30.23 |
| 4* | −2.422 | 0.95 | | |
| 5 (diaphragm) | ∞ | 1.13 | | |
| 6* | −7.096 | 1.23 | 1.53048 | 55.72 |
| 7* | −1.678 | 1.50 | | |
| 8 | ∞ | 0.30 | 1.51680 | 64.17 |
| 9 | ∞ | 1.25 | | |
| Image surface | ∞ | | | |

TABLE 4-continued

Aspheric surface coefficient

3$^{rd}$ surface k = 0
A4 = 0.00883284582269
A6 = −0.00150309906163
A8 = −3.82672855462E−05
A10 = −1.22661405434E−05

4$^{th}$ surface k = 0
A4 = 0.0318548919457
A6 = −0.00838462795765
A8 = 0.00185086078788
A10 = −0.000124996557582

6$^{th}$ surface k = 0
A4 = −0.0149201913318
A6 = 0.0349996648698
A8 = 0.0186898701976
A10 = −0.00897501174907

7$^{th}$ surface k = 0
A4 = 0.0243609118166
A6 = 0.0223380973414
A8 = −0.00844594945275
A10 = 0.00867068171877

| | |
|---|---|
| Focal length | 1.75 |
| F number | 2.8 |
| Angle of view | 118.16 |
| Image height | 2.25 |
| Total lens length | 12.03 |
| Back focal distance | 2.95 |

Table 5 shows values of Examples corresponding to the aforesaid conditional expressions.

TABLE 5

| | Conditional expressions | | | |
|---|---|---|---|---|
| | (1) | (2) | (3) | (4) |
| Example 1 | −2.721 | 1.769 | 30.23 | 55.72 |
| Example 2 | −1.896 | 1.875 | 30.23 | 55.72 |
| Example 3 | −3.197 | 1.442 | 30.23 | 55.72 |
| Example 4 | −2.653 | 2.196 | 30.23 | 55.72 |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wide-angle lens comprising, in order from an object side thereof:
   a first lens having a negative power and comprising a glass body including a spherical surface;
   a second lens having a positive power comprising an aspheric surface; and
   a third lens having a positive power comprising an aspheric surface,
   wherein the wide-angle lens has an angle of view more than 90 degrees and less than 120 degrees.

2. The wide-angle lens of claim 1,
   wherein the wide-angle lens satisfies following expressions:

$-3.3 < f1/f < -1.8$, and $1.4 < f3/f < 2.2$, where f is a focal length of the wide-angle lens,
   f1 is a focal length of the first lens, and
   f3 is a focal length of the third lens.

3. The wide-angle lens of claim 1,
   wherein the wide-angle lens satisfies following expressions:

$vd2 < 50$, and $vd3 > 50$, where vd2 is an Abbe number of the second lens, and
   vd3 is an Abbe number of the third lens.

4. The wide-angle lens of claim 1, further comprising a diaphragm arranged between the second lens and the third lens.

5. The wide-angle lens of claim 1,
   wherein each of the second lens and the third lens is a plastic lens.

* * * * *